United States Patent [19]

Browder

[11] Patent Number: 4,594,699

[45] Date of Patent: Jun. 10, 1986

[54] FARADAY-EFFECT MAGNETO-OPTIC TRANSDUCER APPARATUS OF A ROTARY FORM

[75] Inventor: Lewis B. Browder, Altadena, Calif.

[73] Assignee: Datatape Incorporated, Pasadena, Calif.

[21] Appl. No.: 811,327

[22] Filed: Dec. 19, 1985

Related U.S. Application Data

[63] Continuation of Ser. No. 693,486, Jan. 22, 1985, abandoned, which is a continuation-in-part of Ser. No. 505,640, Jun. 20, 1983, abandoned.

[51] Int. Cl.$^4$ ............................................. G11B 11/00
[52] U.S. Cl. ........................................ 369/13; 360/114
[58] Field of Search ................................. 369/13–15; 360/55, 59, 110, 112, 114; 358/200, 285, 345–348, 901; 365/122; 350/227

[56] References Cited

U.S. PATENT DOCUMENTS

| | | |
|---|---|---|
| 2,773,120 | 12/1956 | Masterson . |
| 3,171,754 | 3/1965 | Smaller . |
| 3,229,273 | 1/1966 | Baaba et al. . |
| 3,314,075 | 4/1967 | Becker et al. .................. 369/97 X |
| 3,379,832 | 4/1968 | Judin ................................ 358/200 |
| 3,435,423 | 3/1969 | Fuller et al. .................... 340/172.5 |
| 3,448,211 | 6/1969 | Haynes et al. ................. 360/114 X |
| 3,465,327 | 9/1969 | Stapper, Jr. . |
| 3,521,262 | 7/1970 | Paul ................................ 360/114 X |
| 3,549,826 | 12/1970 | Browning . |
| 3,571,807 | 3/1971 | Candy et al. ................... 340/172.5 |
| 3,588,218 | 6/1971 | Hunt et al. . |
| 3,636,535 | 1/1972 | Cushner et al. . |
| 3,665,431 | 5/1972 | Alstad et al. .................... 340/174 |
| 3,700,911 | 10/1972 | Wildhaber . |
| 3,737,236 | 6/1973 | Borrelli . |
| 3,823,276 | 7/1974 | Maslowski et al. . |
| 3,860,749 | 1/1975 | Orii et al. ...................... 358/901 X |
| 4,115,869 | 9/1978 | Putnam et al. .................... 364/900 |

FOREIGN PATENT DOCUMENTS

| | | |
|---|---|---|
| 2424260 | 5/1974 | Fed. Rep. of Germany . |
| 2609980 | 3/1976 | Fed. Rep. of Germany . |
| 2070314A | 9/1981 | United Kingdom . |

OTHER PUBLICATIONS

IBM-Tech-Disc. Bul., vol. 19, No. 6, Nov. 76, p. 2286; Cocke et al., "Fiber Optics Scanner".
IBM Technical Disclosure Bulletin, vol. 16, No. 11, published Apr. 1974.
Patent Abstracts of Japan, vol. 5, No. 92, published Jun. 16, 1981, Jap. Pat. No. 56-37839.
Patent Abstracts of Japan, vol. 6, No. 145, published Aug. 4, 1982, Jap. Pat. No. 57-64333.
Patent Abstracts of Japan, vol. 6, No. 212, published Oct. 26, 1982, Jap. Pat. No. 57-117142.
Patent Abstracts of Japan, vol. 7, No. 15, published Jan. 21, 1983, Jap. Pat. No. 57-169946.
IBM Technical Disclosure Bulletin, vol. 13, No. 2, published Jul. 1970, p. 354.
IBM Technical Disclosure Bulletin, vol. 15, No. 6, published Nov. 1972, pp. 1790 and 1791.
IBM Technical Disclosure Bulletin, vol. 16, No. 11, published Apr. 1974, pp. 3496–3497.

Primary Examiner—Aristotelis M. Psitos
Attorney, Agent, or Firm—Dennis P. Monteith

[57] ABSTRACT

A Faraday-effect magneto-optic transducer of a rotary form includes first and second optical fibers having adjacent ends aligned with each other for joint rotation along a circular path. Opposing surfaces of a planar element of a magneto-optic material are attached respectively to the adjacent ends of the fibers for rotation therewith. The first fiber is arranged with respect to a light source for scanning an entering beam of polarized light along the circular path, a portion of which is immediately adjacent and substantially parallel to the information-bearing surface of a magnetic storage device, such as magnetic tape. The planar element modulates the entering light according to the magnetization of the region of the storage device adjacent the magneto-optic material. The second optical fiber receives light transmitted through the magneto-optic material, to form a beam of polarized light exiting the transducer, whereby the exiting light is modulated with respect to the entering light because of the Faraday magneto-optic effect.

7 Claims, 3 Drawing Figures

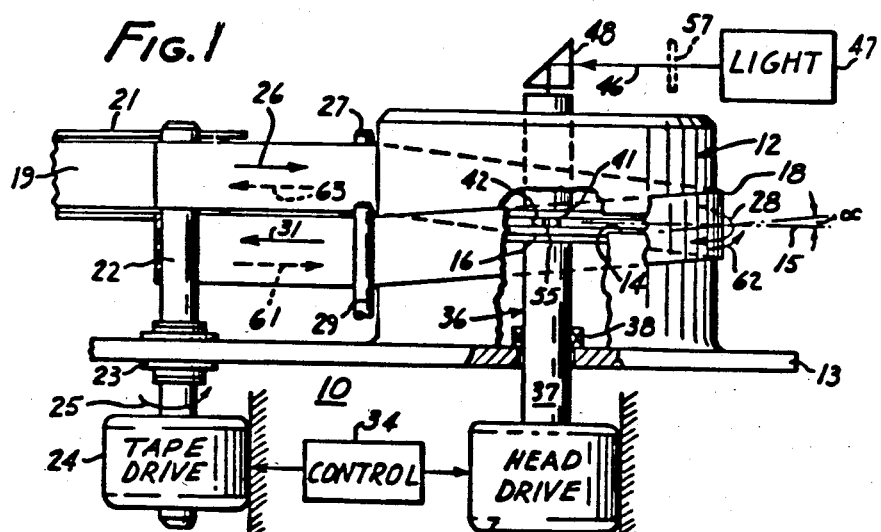
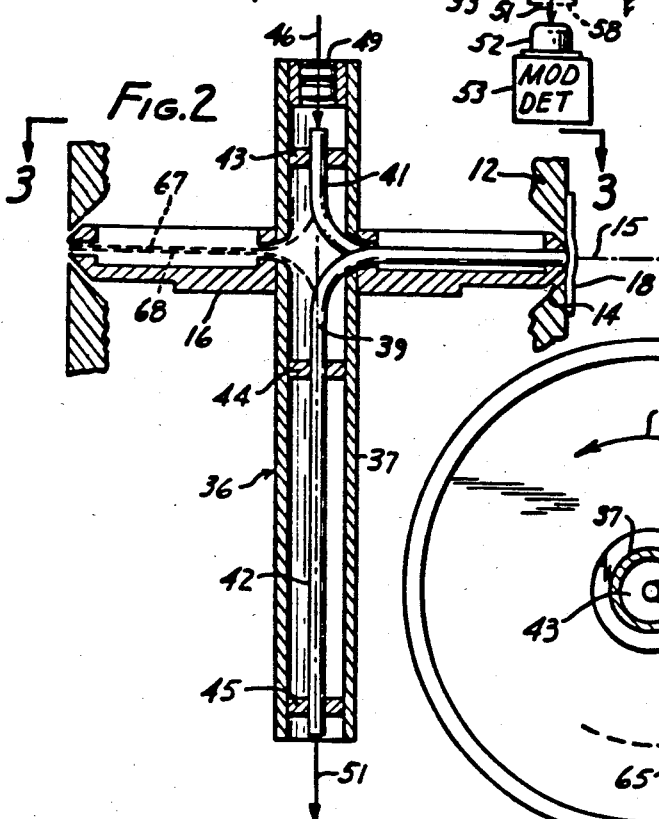
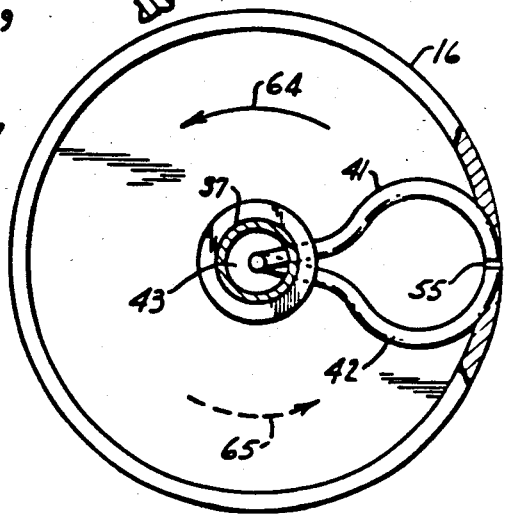

FARADAY-EFFECT MAGNETO-OPTIC TRANSDUCER APPARATUS OF A ROTARY FORM

CROSS-REFERENCE TO A RELATED APPLICATION

This a continuation of application Ser. No. 693,486, filed Jan. 22, 1985, now abandoned, which application is a continuation-in-part of U.S. patent application Ser. No. 505,640, now abandoned, filed June 20, 1983, by Lewis B. Browder, and entitled MAGNETIC RECORD SCANNING METHODS AND APPARATUS.

BACKGROUND OF THE INVENTION

1. Field of the Invention

This invention relates to apparatus for reading information recorded on a magnetic storage device, such as magnetic tape. In particular, the invention relates to Faraday-effect magneto-optic transducer apparatus of a rotary form.

2. Description Relative To The Prior Art

A requirement for recording high-frequency signals on magnetic tape is that the tape move at a high speed relative to a magnetic record head, commonly called the head-to-tape scanning speed. In the prior art a high scanning speed is normally achieved by rotating a magnetic record head at a relatively high speed at an angle other than 0° relative to the transporting of the tape. In this manner the magnetic head records information along a series of parallel slant tracks extending across the tape from edge to edge. By so moving the magnetic head, a high head-to-tape scanning speed is achieved without moving the tape itself at a high speed. Thus, high-frequency information can be recorded without consuming an excessive amount of tape.

When the recorded information is read from the tape, a playback head has to follow the recorded tracks exactly as they are put on the tape. This requires that the speed and direction of the playback head are controlled synchronously with tape playback speed and tape direction, respectively.

It is frequently desirable to play back the magnetic tape at a speed that is higher than the tape speed during recording, in order to quickly find a particular passage or one or more specific records. This is, however, difficult with slant-track equipment employing a conventional wire-wound magnetic read head in which, for the high frequency recording, the regular recording and playback speed may already be on the order of the upper limit of the capability of the equipment. For example, information at frequencies on the order of three megahertz can at modern packing densities be recorded at a head-to-tape speed of the order of about 250 centimeters per second. A tape playback speed on the order of fifteen times the tape recording speed would, for instance, be desirable. In this example, a playback speed on the order of 3750 centimeters per second would be required. From a mechanical point of view, this is well within the mechanical capabilities of, say, a rotary head form of tape transport.

However, an increase of normal operating speed for playback purposes results in a corresponding increase of playback frequency. For instance, when the high frequency band-edge of the magnetically recorded information is three megahertz, then playback at fifteen times normal head-to-tape speed results in an increase of the upper band-edge frequency to 45 megahertz.

The conventional wire-wound magnetic read heads are incapable of functioning satisfactorily at such elevated frequencies, particularly in view of eddy current losses in the core structure and self-resonant problems in the windings. This, in practice, severely impedes, if not prohibits, in many instances a searching of recorded information at a speed that is significantly higher than the normal operating speed, when such operating speed is already close to the existing capability of playback equipment, notably of a conventional magnetic playback head.

Magneto-optic transducers are known in the prior art for reading information recorded on magnetic tape. A particular advantage of a transducer of this type is its ability to resolve particularly small dimensions of tape magnerization. For example, U.S. Pat. No. 3,665,431 discloses a Faraday-effect magneto-optic transducer that may resolve a dimension of magnetization on the order of only 200 Angstrom units.

However, prior art magneto-optic transducers have been primarily of a stationary form. Accordingly, magnetic playback techniques employing a magneto-optic transducer have been limited generally to reading information recorded in a longitudinal format, i.e. information along a track parallel to the length of the tape, as only the tape is moving and the transducer is stationary. Longitudinal recording is generally limited to relatively low scanning speeds so as not to consume an excessive amount of tape. Thus, longitudinal recording is normally restricted to low-frequency applications, such as audio recording.

IBM Technical Disclosure Bulletin, Vol. 16, No. 11, published April 1974, discloses a magneto-optic device of rotary form, for read out of information recorded on a magnetic tape which is helically wrapped around a mandrel. A circumferential strip of magneto-optic material is coated on a surface of a ring prism, such surface being coplanar with the surface of the mandrel. Magnetization from the magnetic tape transfers to the magneto-optic material as the tape moves around the mandrel. A rotor having light-scanning and light-directing optics is mounted for rotation inside the mandrel. The light-scanning optics sweep a beam of polarized light in a circular direction along the strip of magneto-optic material, and the light-directing optics direct light reflected from the strip through an open end of the rotor.

In the magneto-optic apparatus disclosed in the IBM bulletin, light reflected from the magneto-optic material is modulated because of the Kerr effect, with the modulation corresponding to the magnetization transferred to the strip. A disadvantage of a Kerr-effect magneto-optic device, rotary or stationary form, is that linear resolution of the magnetic record is limited by the width of the light beam reflected off the magneto-optic material. A light beam having a cross-section on the order of microinches is the smallest beam possible. Accordingly, a magneto-optic transducer of the Kerr type limits the smallest possible dimension of magnetization that can be resolved, which thereby can restrict the high frequency response of the transducer.

SUMMARY OF THE INVENTION

In view of the foregoing, an object of the invention is to overcome the aforementioned resolution problem of rotary magneto-optic transducer apparatus and, in so doing, provide improved magneto-optic apparatus for reproducing high-frequency information.

The object of the invention is achieved with Faraday-effect magneto-optic transducer apparatus of a rotating form. The magneto-optic apparatus comprises a first movable light-directing means for scanning an entering beam of polarized light along an operational path. A second light-directing means, synchronously movable with the first light-directing means in association with the optical path, is arranged for receiving entering light to form a beam of polarized light exiting the transducer apparatus. A relatively thin planar element of magneto-optic material is interposed between the first light-directing means and the second light-directing means adjacent an information-bearing surface of a magnetic storage device for influence by a magnetic field that is capable of varying the light transmission property of the planar element.

In accordance with the invention, the planar element of magneto-optic material is positioned transverse to the entering beam of polarized light with opposing surfaces of the planar element being adjacent respectively the first light-directing means and the second light-directing means, to cause entering light scanned along the operational path by the first light-directing means to be received by the second light-directing means after transmission through the element. With this arrangement of the magneto-optic material, the beam of light exiting the transducer apparatus is modulated with respect to the entering beam of light because of the Faraday magneto-optic effect.

Because the entering light is transmitted through the magneto-optic material, the linear resolving power of the transducer apparatus is related to the thickness of the planar element. Accordingly, the resolving power of the transducer can be on the order of a few hundred Angstrom units, as exemplified by the aforementioned U.S. Pat. No. 3,665,431.

A further advantage of the invention is that the sensitivity of the planar element to magnetization from the magnetic storage device is also related to the thickness of the magneto-optic material. Thus, the sensitivity of the planar element to magnetization can be controlled by precisely controlling the thickness of the magneto-optic element.

These and other advantages of the invention will become more apparent in the detailed description of a preferred embodiment presented below.

BRIEF DESCRIPTION OF THE DRAWING

In the detailed description of a preferred embodiment of the invention presented below, reference is made to the accompanying drawing, in which:

FIG. 1 is a side view of a magneto-optic transducer, according to a preferred embodiment of the subject invention, for scanning magnetic tape;

FIG. 2 is a detail view of the magneto-optic transducer used in the apparatus of FIG. 1, with adjacent parts broken away; and FIG. 3 is a view taken on the line 3—3 in FIG. 2, with adjacent parts being omitted.

DETAILED DESCRIPTION OF A PREFERRED EMBODIMENT

Apparatus for magnetically recording high frequency information is well known in the prior art, for example quad-head and helical recorder apparatus for recording information in a slant track format. The following description is directed in particular to playback apparatus forming part of, or cooperating directly with, magneto-optic transducer apparatus in accordance with the present invention, for reading information recorded on magnetic tape in a slant track format. Magnetic playback apparatus not specifically shown or described may take various forms well known to those skilled in the art.

One way of carrying out the invention is described in detail below with reference to a drawing, which illustrates only one specific embodiment. Referring to FIG. 1, an optical scanner 10 has a cylindrical drum member 12 mounted on a baseplate 13. The drum member 12 may be of a conventional type now used in video tape helical recorder and playback equipment for recording and reading information, respectively, along a series of parallel slant tracks, which are at a relatively sharp angle to the edge of the tape. The peripheral surface of drum member 12 has a circumferential gap 14 in parallel with the baseplate 13. A scanner wheel 16 is mounted in alignment with the gap 14 for rotation in a plane of operation 15.

Magnetic tape 18 is unwound from a roll 19 on a reel 21 by a capstan 22 which extends through a bearing 23 in the baseplate 13 and is rotated by a drive motor 24 in the direction of the arrow 25. The tape thereupon moves in the direction of arrow 26 to the drum member 12. A guide pin 27 guides the tape 18 against the peripheral surface of the drum member 12.

An arrow 28 indicates how the tape 18 travels around the drum member 12 to be further guided by a pin 29 located in the vicinity of the pin 27. The tape 18 is therefore partially wrapped around the surface of the member 12 as the tape is transported between the pin 27 and the pin 29. The tape is thereupon transported in the direction of arrow 31 by the capstan 22 and is taken up by a reel (not shown) which is similar to the supply reel 21.

It is noted that an angle alpha ($\alpha$) is shown in FIG. 1. Alpha ($\alpha$) is the angle between the plane 15 and the longitudinal axis of the tape 18 at the point where the tape 18 intersects the plane 15. The angle $\alpha$ is other than 0° and is made possible by the illustrated arrangement of the guide pins 27 and 29 and the manner in which the tape is driven by the capstan 22. For the purpose of clarity of illustration, brackets for mounting the guide pins 27 and 29 have not been shown. Examples of these, as well as of other guide means for facilitating the illustrated travel of the tape relative to a scanner wheel, have extensively been published in existing literature on video tape helical recorders. The aforementioned quad-head recorder apparatus, which is used extensively in the broadcast industry, uses a somewhat different arrangement for moving magnetic tape and a scanner wheel to each other.

A head drive motor 33 rotates the scanner wheel 16. A control 34 correlates the operation of the motors 24 and 33 so that the scanner wheel 16 and capstan 22 are rotated in appropriate directions and at predetermined rates. So that the wheel 16 moves at a speed relative to the speed of the tape 18, to produce an appropriate scanning speed without moving the tape itself at high speed, the rotation of the wheel 16 is in a direction a component of which is opposite to the tape transport direction. A control of a type conventionally employed with tape and head drives in video tape recording and other slant track systems, may be used at 34 in controlling the rotation of the scanner wheel 16 and the advance of the tape 18.

The wheel 16 is part of a scanner 36 having a hollow shaft 37 for mounting and rotating the wheel. A symbolically illustrated bearing 38, similar to the capstan bearing 23, is shown for rotatably mounting the shaft 37 on the baseplate 13.

A preferred embodiment of magneto-optic transducer apparatus of a rotating form constituting the subject invention is shown in FIG. 2. Magneto-optic transducer apparatus according to the invention requires first light-directing means for scanning an entering beam of polarized light along an operational path which is immediately adjacent and substantially parallel to a tape-engaging surface of the drum member 12. For that purpose, a first optical fiber 41 extends from the gap 14 partially along the plane of operation 15 of the wheel 16. The fiber 41 is then routed along the hollow shaft 37, which forms an axis 39 of the wheel 16 and scanner 36. As shown in FIG. 3, the extreme end of the fiber 41 at the gap 14 is substantially parallel to the surface of drum member 12, for directing light parallel to the surface of the member 12.

The invention also requires second light-directing means, synchronously movable with the first light-directing means along the operational path, for receiving the entering beam of polarized light, to form a beam of polarized light exiting the transducer apparatus. For that purpose the preferred embodiment of the invention includes a second optical fiber 42, an end of which is aligned with the end of the fiber 41 at the gap 14. The fiber 42 extends from the gap 14 along the plane 15, is then routed through the hollow shaft 37 along the axis 39 in a direction opposite that of the fiber 41, as shown in FIG. 2. One or more spacers 43 may be employed for mounting the first optical fiber 41 in the hollow shaft 37, while spacers 44 and 45 may be employed for mounting the second fiber 42 in the hollow shaft 37. The head drive 33 and scanner 36 are thus capable of jointly rotating the first and second optical fibers 41 and 42 in a circular path at gap 14 about the axis 39.

So that the beam of light exiting the transducer apparatus is modulated with respect to the entering beam of light because of the Faraday magneto-optic effect, the invention further requires that entering light scanned along the operational path by the first light-directing means is received by the second light-directing means after transmission through a magneto-optic material. For that purpose, a planar element of magneto-optic material 55 is positioned between the first light-directing means and the second light-directing means adjacent the information-bearing surface of the tape 18 and transverse to the entering light beam. Opposing surfaces of the magneto-optic element 55 are attached respectively to the ends of the fibers 41 and 42, which are aligned end-to-end ar the gap 14, as shown in FIG. 3. Preferably, the thickness of the element 55 is precisely controlled and is a few hundred Angstrom units, for resolving particularly small dimensions of tape magnetization.

Because magnetization in the tape 18 induces magnetism in the magneto-optic element 55 only a short distance from the tape, the ends of the fibers 41 and 42 and the element 55 are positioned precisely on the circumference of the wheel 16 so that the element 55 protrudes a very short distance through the gap 14. When the fibers 41 and 42 are within the gap 14 adjacent the tape 18, the circumferential edge of the element 55 is in a contacting relationship with the tape, and the plane of the element 55 extends in a track-wide direction generally perpendicular to the tape.

Magneto-optic materials are well known in the prior art as may, for instance, be seen from the aforementioned U.S. Pat. No. 3,665,431. Suitable magneto-optic materials for the element 55 include light-transparent magnetically permeable films of Permalloy (80% Ni and 20% Fe), pure iron, alloys of germanium-iron, iron-cobalt and combinations of iron with magnesium fluoride, as well as other magneto-optic materials.

By way of example, magnetite or one of the above mentioned magneto-optic materials is deposited with appropriate uniform thickness as a layer of material 55 on a polished end of the first optical fiber 41, while a polished end of the second optical fiber is bonded to the layer of material 55. The resulting assembly is encapsulated at the scanner wheel 16.

In the reading of information recorded on the tape 18, the control 34 causes energization of the motor 33 and the drive motor 24. Thus, the tape 18 moves from the reel 21 past the drum member 12 at an angle other than 0° to the plane of operation 15 of the wheel 16, which rotates in a direction opposite to the transporting of the tape. As this occurs, the element 55 moves in a slant track across the tape 18 from one edge to the other with each revolution of the shaft 37. By means known in the art, synchronization signals recorded along the edge of the tape 18 enable the control 34 to operate the scanner 36 and the tape drive 24 so that each pass of the element 55 occurs in alignment with a data track as recorded on the tape.

In order to read the magnetism of the element 55, a light source 47 is employed for emitting light as a beam to a prism 48 which deflects and projects the light through focusing lenses 49 into the first optical fiber 41. FIG. 1 shows a polarizer 57 between the light source 47 and the prism 48, that provides a plane polarized beam of light, denoted 46, proceeding to the first optical fiber 41. However, the light 46 may be polarized during transmission by the first optical fiber 41, and other conventional means for polarizing the light transmitted through the first optical fiber 41 may be employed, as desired.

The polarized light 46 thus travels along the first optical fiber 41 and through the element 55, for modulation by the element 55. With each revolution of the shaft 37, the optical fibers 41 and 42 and the element 55 move in synchronism across the tape from one edge to the other edge. Thus, the scanner 36, the optical fiber 41, and the prism 48 serve as a means for scanning the polarized light beam along a circular path at least a portion of which is substantially coplanar with the surface of the member 12 and which is at an angle relative to the direction of the transporting of the tape 18.

The plane of polarization of the light transmitted through the element 55 is rotated to a degree in accordance with the magnetism stored by the element 55. That is, the direction and amount of rotation depends on the magneto-optic characteristics of the element 55 and the state of magnetization of the tape 18 as the element 55 is scanned adjacent the tape. Thus, at any given instant of time the light transmitted through the element 55 is modulated as a function of information recorded on the portion of the tape 18 that is adjacent the element 55. Accordingly, the modulation corresponds to a dimension of tape magnetization related to the thickness of the element 55, i.e. a few hundred Angstrom units.

Light modulated by the element 55 enters the second optical fiber 42, which serves as a means, optically coupled to the element 55, for directing the modulated light, denoted 51, through an analyzer 58 to a light detector 52, such as a photocell, phototube, etc.

The intensity of the light transmitted through the analyzer 58 is dependent upon the angle of the modulated light wave. As the state of magnetization of the element 55 is changed by the magnetization of the tape 18, the angle of rotation of the transmitted light wave changes, thereby changing the intensity of the light transmitted to the light detector 52. Thus, the analyzer 58 and the light detector 52 serve as light-responsive apparatus for producing an electrical signal that is a function of the modulation of received light.

A modulation detector 53 detects the modulation in the output current, or output voltage, of the light detector 52. Such a modulation detector is conventional and may be part of conventional equipment for rendering the detected information discernible, visible or otherwise further usable.

The illustrated preferred embodiment of the subject invention may be employed for rapid searching of magnetically recorded information prior to, independently of, or as an aid to reproduction of the information by magnetic playback heads. The searching speed may be more than ten times faster than the regular playback speed and may be effected forwardly or backwardly, as indicated by the alternative solid and dotted arrows 26, 28, 31, 61, 62, 63, 64, and 65 in FIGS. 1 and 3.

As indicated in dotted outlines at 67 and 68, a second pair of optical fibers may be employed in the scanner wheel 16 so as to take turns with the first pair of fibers 41 and 42 in the searching of magnetic information recorded on tape 18. The second pair of optical fibers 67 and 68 may be a duplicate of the first pair 41 and 42, having a magneto-optic light modulating material 55 therebetween, such as at a location diametrically opposite to the solidly illustrated material 55 on the scanner wheel.

Such a modification of the solidly illustrated embodiment may, for instance, be useful in the case of conventional half-wrap, and omega-wrap of the tape 18, whereas a single magneto-optic transducer, as shown in the drawing, may be more useful in a conventional full-wrap and alpha-wrap of the tape. Moreover, three or four pairs of optical fibers, spaced 120° or 90° apart or otherwise, may be employed on the scanner disc as desired or necessary for various given applications.

The element 55 may be mounted within the gap 14 so as to be in the path of the light beam only as the light is scanned across the tape 18. With this arrangement, the outermost surface of the element 55 would be curved to conform to the wrap of the tape 18 around the drum member 12, and the element 55 elongated to extend across the tape from one edge to the other edge where the tape 18 intersects the plane 15. The aligned ends of the optical fibers 41 and 42 would be spaced according to the thickness of the element 55 to permit their synchronous rotation relative to and immediately adjacent opposite sides of the element 55 as the fibers are rotated across the tape 18.

The subject invention has widespread utility in various security, data processing, information handling, monitoring, surveillance and reproducing fields. Reference may, for instance, be had to the methods and apparatus for processing data including a characteristic mark, disclosed in U.S. Pat. No. 4,115,869, which discloses a system for detecting recurring characteristic marks, such as a line delimiter mark or an executive mark, or a recurring error. The subject invention may, for instance, be employed to scan a record at very high speed for a detecting function of the latter type.

By way of further example, reference may be had to U.S. Pat. No. 3,435,423 for a digital data storage and retrieval system for searching information from the tracks of a disc memory. The subject invention, operating in circular paths, can also be employed for such tasks.

The invention may also be employed in redundancy reduction systems of the type shown in U.S. Pat. No. 3,571,807, which discloses an image frame redundancy reduction system.

A magneto-optic transducer, according to the invention, has an improved frequency response with respect to a conventional magnetic read head and with respect to magneto-optic transducer apparatus of the Kerr type. A magnetic head requires a small gap for high-frequency response on playback. If the gap is longer than the wavelength on the tape, there is flux cancellation and thus little current induced in the head windings. Kerr type magneto-optic apparatus has a resolution limited by the width of an entering light beam, which is wide relative to the thickness of the planar element 55.

For a somewhat related reason, the magneto-optic transducer of the invention offers certain other advantages over a conventional magnetic head for playback of intermediate and high frequencies because the output voltage from a magnetic playback head is a function of the frequency of the recorded signal. When a magnetic head is used for play back, equalization circuitry is needed to compensate for the frequency dependency of the head, which is not the case with magneto-optic transducer apparatus.

What is claimed is:

1. In a magneto-optic transducer apparatus of a rotary form for use with a magnetic storage device having an information-bearing surface producing magnetic fields, said transducer apparatus including first movable light-directing means for scanning an entering beam of polarized light along an operation path, second light-directing means, synchronously movable with said first light-directing means in association with the operational path, for receiving entering light, to form a beam of polarized light exiting said transducer apparatus, and a planar element having a light transmission property for modulating polarized light in accordance with an applied magnetic field, said element being interposed between said first light-directing means and said second light-directing means adjacent the information-bearing surface of such magnetic storage device, for influenece by a magnetic field that is capable of varying the light transmission property of said element, the improvement wherein:

(a) said first light-directing means is arranged for scanning light leaving said first light-directings means along an operational path which is immediately adjacent to and substantially parallel with the information-bearing surface of such magnetic storage device; and (b) said planar element is positioned transverse to the entering light beam as it leaves said first light-directing means, with opposing surfaces of said planar element being adjacent respectively the exit end of said first light-directing means and the entrance end of said second light-directing means, to cause entering light scanned along the operational path by said first light-directing means to be received by said second light-directing means after transmission through said planar element in close proximity to the information-bearing surface of such magnetic storage device, whereby the beam of light exiting said transducer apparatus is modulated with respect to the entering light beam because of the Faraday magneto-optic effect.

2. Magneto-optic transducer apparatus as defined in claim 1 for use with amagnetic tape wrapped at least partially around a member of said transducer apparatus during transporting of such tape, wherein said first light-directing means is arranged so that the operational path is curved and is substantially coplanar with the tape-engaging surface of said member.

3. Magneto-optic transducer apparatus as defined in claim 2, wherein said first light-directing means includes a first optical fiber arranged to scan the entering light beam along the curved path, and said second light-directing means includes a second optical fiber an entrance end of which is aligned with an exit end of said first fiber to receive entering light.

4. Magneto-optic transducer apparatus as defined in claim 3, wherein said first optical fiber and said second optical fiber are arranged with respect to each other to rotate in synchronism around a common axis.

5. Magneto-optic transducer apparatus as defined in claim 3, wherein said planar element is interposed between the aligned ends of said first and second fibers for modulating light transmitted through said first fiber into said second fiber.

6. Magneto-optic transducer apparatus as defined in claim 5, wherein opposing surfaces of said planar element are attached respectively to the ends of said first and second optical fibers for rotation of said planar element together with the optical fibers.

7. Magneto-optic transducer apparatus as defined in claim 1, wherein said planar element has a circumferential edge which is positioned for contacting the magnetic tape as the entering light beam is scanned along the curved path adjacent the tape.

* * * * *